United States Patent [19]

Hannon et al.

[11] 4,021,288
[45] May 3, 1977

[54] ATTACHMENT FOR CONVERTING A SHEET LAMINATING MACHINE

[76] Inventors: Donald F. Hannon, 7391 Markell Road, R.D. No. 3, Willoughby, Ohio 44094; George E. Swingle, P.O. Box 84, Honeoye, N.Y. 14471

[22] Filed: July 2, 1975

[21] Appl. No.: 592,606

[52] U.S. Cl. ............................ 156/499; 100/93 P; 100/93 RP; 156/555; 156/583
[51] Int. Cl.² ........................................ B30B 15/34
[58] Field of Search .......... 156/499, 536, 552, 555, 156/583, 582; 100/93 RP, 138, 155, 176, 93 P

[56] References Cited

UNITED STATES PATENTS

| | | | |
|---|---|---|---|
| 3,163,104 | 12/1964 | Lapham | 156/583 |
| 3,309,983 | 3/1967 | Dresser | 156/555 |
| 3,711,355 | 1/1973 | Staats et al. | 156/555 |
| 3,770,550 | 11/1973 | Levitan | 156/555 X |
| 3,823,047 | 7/1974 | Colombo | 156/555 |

*Primary Examiner*—William A. Powell
*Assistant Examiner*—M. G. Wityshyn
*Attorney, Agent, or Firm*—Meyer, Tilberry & Body

[57] ABSTRACT

There is provided an attachment for use on a somewhat standard sheet laminating machine of the type including two vertically spaced upper and lower heating elements defining therebetween a pass along which sheet material moves in a direction from the front to the back of the elements. Each heating element has a front facing, curvilinear heated donor surface extending transversely of the workpiece pass and curved in a direction generally parallel to the pass. This type of sheet laminating machine also includes two vertically spaced pressure rolls behind the heating elements and extending transversely of the pass with one of the rolls on each vertical side of the pass. The attachment includes first and second heat conducting elements formed from a metal havng high thermal conductivity, with each of the heat conducting elements having generally flat platen plates and integral heat receptor portions. The heat conducting elements are mounted together at the platen plates and the heat receptor portions have receptor surfaces generally matching the donor surfaces of the previously mentioned heating elements. In this manner, the attachment may be mounted directly onto the heating elements with the donor surfaces contacting the receptor surfaces so that heat energy is conducted to the receptor surfaces and from there to the platen plates between which the workpiece to be laminated is fed for subsequent lamination by the pressure rolls.

2 Claims, 9 Drawing Figures

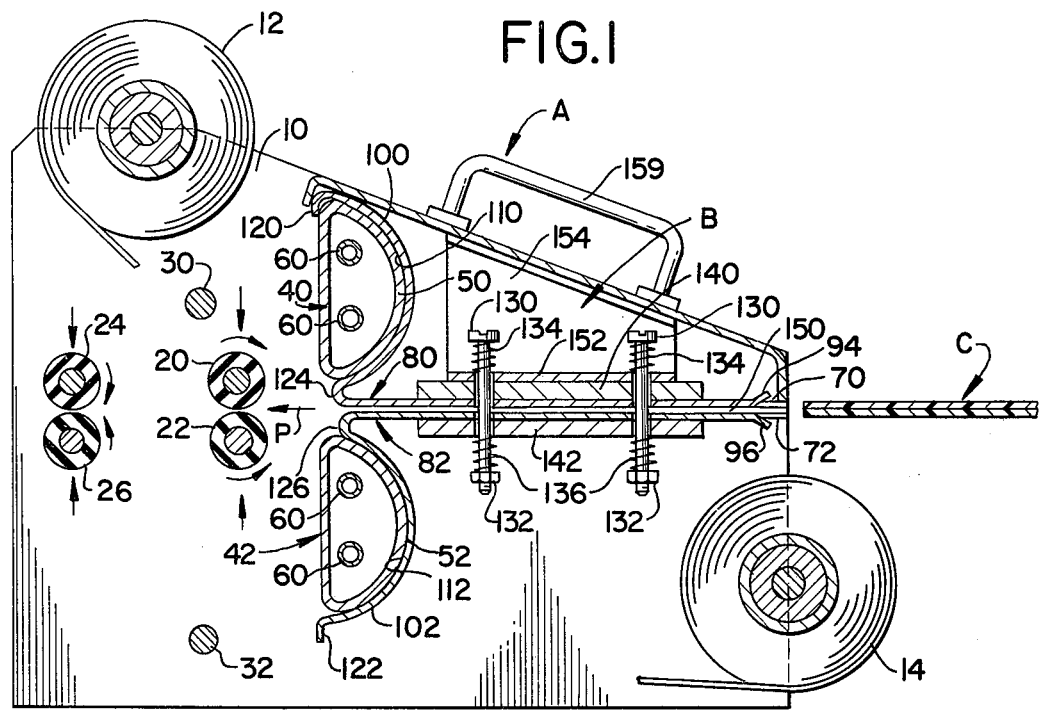
FIG.1
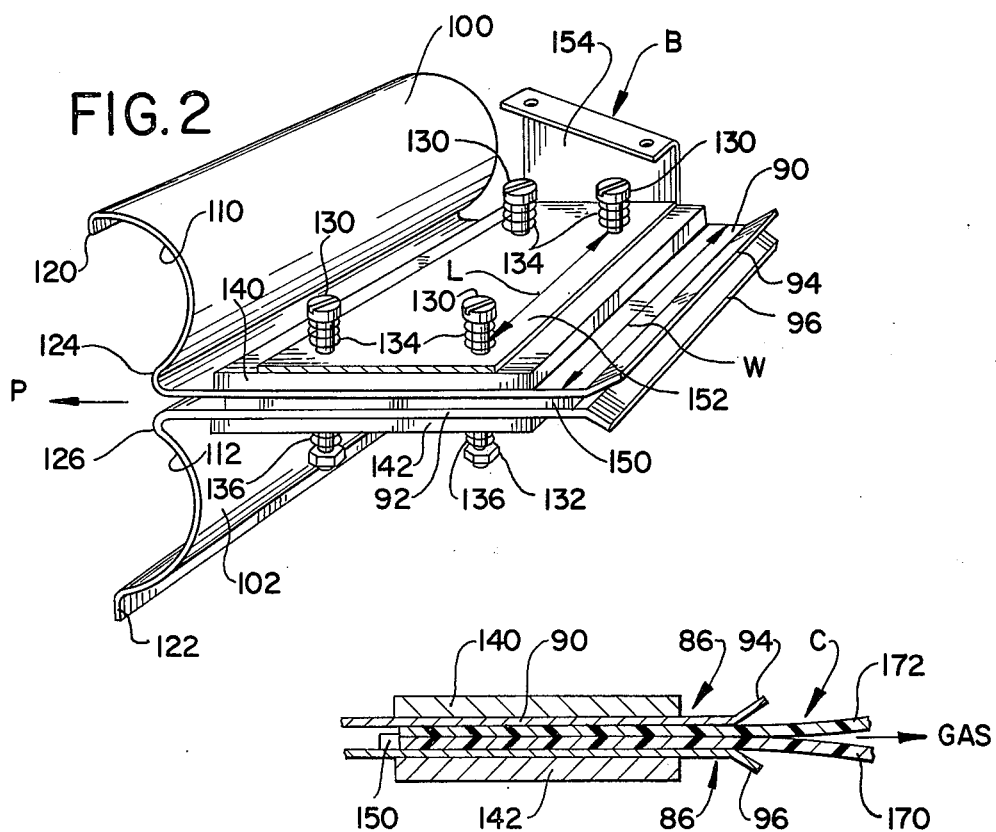
FIG.2
FIG.6

ATTACHMENT FOR CONVERTING A SHEET LAMINATING MACHINE

This invention relates to the general art of laminating machines and more particularly to an attachment for converting a sheet laminating machine into a machine for laminating a dry mounting type of laminate.

The invention is particularly applicable for converting a standard sheet laminating machine into a dry mount type of laminating machine and it will be described with particular reference to this type of conversion; however, it is to be appreciated that the invention has much broader applications and may be used to convert the standard sheet laminating machine to a machine capable of laminating the various flat composite laminates.

BACKGROUND OF INVENTION

It has become somewhat common practice to laminate discrete sheet stock by heating one or two sheets of Mylar coated with polyethylene to a temperature sufficient for heat sealing of the polyethylene and then passing the sheets over the stock and between pressue rolls for final lamination. Various machines have been developed for this type of laminating operation. Such machines require elements for preheating the plastic laminating sheets, which are normally Mylar coated with polyethylene, and means for bringing the sheets into contact with the stock to be laminated and then pulling the sheets and stock through the pressure rolls. One of the most commonly used of these laminating machines incorporates two vertically spaced heating elements over which the Mylar sheets are drawn for heating. The Mylar contacts the heating elements and conducts heat to the polyethylene. These spaced heating elements have curvilinear surfaces facing toward the front end of the machine and are coated generally with a non-stick material, such as Teflon, so that as the sheets of Mylar are pulled over the heating elements to the laminating position they are heated to a sufficiently high temperature for pressure lamination of the polyethylene against the sheet stock to be laminated. Heretofore, this type of machine has been used for laminating discrete sheet stock such as menus, identification cards, place mats, etc. In these applications, the Mylar sheets, after being heated by the heating elements, are pressed against opposite surfaces of the discrete sheet stock and laminated thereto. This machine has proven quite satisfactory for use in this type of sheet laminating.

In the art of laminating, many applications do not lend themselves to use of a standard sheet laminating machine of the type described above. One of these operations is dry mounting wherein a graphic print of some type is adhered to a rigid board stock by an intermediate layer of hot adhesive material, such as polyethylene. In many instances, there is no overlay of Mylar or other plastic material to protect the graphic print, although this is possible in some applications. In a dry mounting operation, the graphic print, such as a photograph, drawing, map, etc., is placed onto a somewhat rigid board stock with an intermediate layer of hot adhesive material, which may be polyethylene. This laminate is heated and pressed together to form a permanent bond between the graphic print and rigid board stock. The above described standard sheet laminating machine is not applicable for this purpose. The only heating occurs at the heating elements which are spaced from the pass or feed line of the workpiece. Consequently, the rigid board stock with an asembled print could not be heated and pressed together. This type of machine has not been used or even suggested for dry mounting although they are inexpensive and available in most laminatng plants.

Heretofore, dry mounting has been performed in platen presses wherein two large, flat heated platens are employed. One platen is generally stationary and the other platen is pivoted into a parallel pressure relationship with the stationary platen. The platens are not completely flat and when the pivoted platen is brought into pressure relationship with the stationary platen, sight variations can exist in the spacing of the platens. In normal operation, a dry mount laminate, including the rigid board, intermediate adhesive layer and graphic print, is placed between the platens and the movable platen is moved into contact with the laminate compressing it between the heated platens. The two platens are then held together for a substantial length of time, which may be in the general range of 45 seconds. Thereafter, the movable platen is shifted from the stationary platen and the dry mount laminate is removed. Variations in the spacing between the platens can cause certain variations, especially when the dry mount laminate is relatively large. In addition, any moisture in the laminate is trapped and causes gas pockets, which prevent adherence over the total surface of the laminate. Even with these obvious disadvantages of using two relatively movable platens, this type of machine is still widely used for dry mounting operations.

DESCRIPTION OF THE INVENTION

The present invention relates to an improvement in the laminating art for use in processing a dry mounting laminate, which improvement does not have the disadvantages of the prior movable platen type of machine.

In accordance with the present invention, there is provided an attachment for use on a standard sheet laminating machine of the type described above which attachment includes first and second heat conductive elements, each of which has a generally flat platen and in integral heat receptor portion. Means are provided for securing the platen plates together in generally parallel relationship so that the heat receptor portions, which are contoured to fit over the standard heating elements of a laminating machine, can be placed over the elements with the platen plates extending along the standard workpiece movement pass. In this manner, the attachment can be placed over the heating elements of standard laminating machines and the dry mounting laminate can pass through the heated platens. Heat energy conducted from the standard heating elements through the heat receptor portions of the attachment is conducted to the flat platen plates of the attachment. This heat energy is used to raise the temperature of the dry mounting laminate to the proper laminating temperature. The standard rolls at the rear of the standard heating elements then pull the dry mount laminate through the machine and press the laminate together to form a final lamination.

By using this attachment, a standard laminating machine may be easily converted from a sheet laminating operation and to a dry mounting laminating operation by the simple procedure of placing the new attachment over the existing heating elements. In using this attachment for dry mounting, the time required for the laminating operation is drastically reduced. In addition, any moisture which may accumulate or be present in the dry mountinglaminate is pushed toward the entrant end of the machine in a continuous fashion as the laminate is passed through the laminating rolls. Consequently, the laminate does not curl, does not have entrapped gas pockets and can be processed quite rapidly.

The primary object of the present invention is the provision of an attachment for a standard sheet laminating machine, which attachment converts the sheet laminating machine to a machine for processing laminates of the type used in dry mounting and for other purposes where a composite or sandwich structure is to be heated and laminated by pressure.

Yet another object of the present invention is the provision of an attachment for a standard sheet laminating machine, which attachment allows the machine to process dry mounting laminates or flat composite sheet structures more rapidly than the prior stationary press type machine.

Yet another object of the present invention is the provision of an attachment as defined above, which attachment allows processing of dry mounting laminates or flat composite sheet structures with a reduction in the amount of entrapped gas.

Still a further object of the present invention is the provision of an attachment as defined above, which attachment allows processing of dry mounting like laminates or other flat composite sheet structures more rapidly and with uniform surface adhesion.

These and other objects and advantages will become apparent from the following description taken together with the accompanying drawings.

BRIEF DESCRIPTION OF DRAWINGS

In the drawings, the following is a description of the views:

FIG. 1 is a schematic side elevational view showing, somewhat in cross-section, the preferred embodiment of the present invention and the apparatus onto which it is attached;

FIG. 2 is a pictorial view illustrating the preferred embodiment of the present invention;

PREFERRED EMBODIMENT

Figure 3:
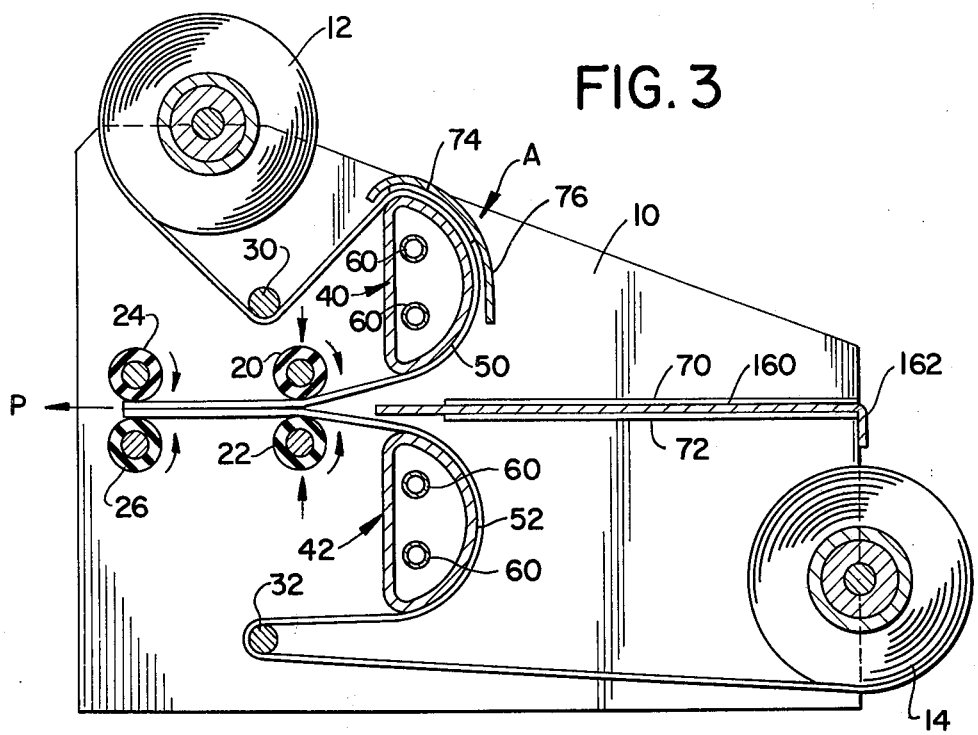
FIG. 3 is a plan elevational view, similar to FIG. 1, showing the sheet laminating machine to which the invention is attached in its normal operating mode.

Referring now to the drawings wherein the showings are for the purpose of illustrating a preferred embodiment only and not for the purpose of limiting same, a standard sheet laminating machine A is illustrated. This machine is somewhat similar to the laminating machine shown in U.S. Pat. No. 3,309,983, which is incorporated by reference herein for more details on the structure of the standard machine. Laminating machine A includes a frame 10 including spaced walls and having secured rotatably thereon supply reels 12, 14, which are provided with sheet laminating material, such as Mylar coated with polyetheylene. These reels are not used when the preferred embodiment of the present invention is employed on machine A. Driven pressure rolls 20, 22 are driven in the direction indicated by the arrows adjacent these rolls, by an appropriate mechanism well known in the art. An appropriate spring biasing mechanism may be used to bias the rolls, as indicated by the vertical arrows, to allow passage of a workpiece therethrough while the rolls exert a laminating pressure on the flat workpiece. These driven rolls extend across the transverse width of machine A and have sufficient transverse lenght to accommodate the width of a workpiece being laminated in the machine. In a like manner, driven rolls 24, 26 may be spring biased together and drivingly engage the workpiece after it has been laminated by rolls 20, 22. In some instances, the second set of driven rolls is spring biased, as indicated by the arrows, to assure sound engagement with the workpiece being drawn through machine A by rolls 24, 26. In practice, rolls 24, 26 can be driven at a higher rotational speed than rolls 20, 22 to apply tension to the workpiece between these two rolls while the workpiece is being cooled by ambient conditions or a positive cooling device located between the rolls. Guide rolls 30, 32 are used to guide the sheet material from supply reels 12, 14, as best shown in FIG. 3. Laminating sheets during normal use of machine A, are passed over upper, lower heating elements 40, 42, respectively. Between these heating elements the workpieces pass along a feed line or pass P. In accordance with standard practice, heating elements 40, 42 include front facing heat donor surfaces 50, 52, respectively. These surfaces are curvilinear with a curved direction generally parallel to pass P. In the preferred embodiment, surfaces 50, 52 are generally semi-cylindrical in profile and are covered with a non-stick material, such as Teflon. Thus, sheet material from reels 12, 14 can be drawn over surfaces 50, 52 and heated to a proper temperature for adhesion of the polyethylene, or other hot adhesive material, on the sheet stock of these reels. To provide heat at donor surfaces 50, 52, there is provided an appropriate internal heating system, such as heating elements 60. In practice, these heating elements can be electrically energized Cal Rods, although other heating elements are possible in machine A. As is more apparent in FIG. 3, each side wall of frame 10 includes outwardly extending, closely spaced rails 70, 72 having a purpose which will be explained in more detail. A removable shield 76 is positioned over the transversely short support rib 74. One of these ribs is provided on each transverse side wall of frame 10 and extends only a short distance from the side of the frame to provide a support for shield 76, as shown in FIG. 3, when machine A is operating in accordance with the prior normal use. This provides a shield for inadvertent human contact with upper heating element 40.

As so far explained, machine A is a standard sheet laminating machine wherein the sheet material from reels 12, 14 is passed over heating elements 40, 42 and onto opposite sides of a workpiece passing along pass or feed line P. The heated sheets are then pressed against the workpiece by rolls 20, 22 and drawn through machine A by these rolls and subsequent driven rolls 24, 26. In accordance with the present invention, there is provided an attachment B for converting a standard sheet laminating machine A into a machine capable of laminating dry mounting laminates C. In accordance with the invention, attachment B includes upper and lower heat conducting elements 80, 82 formed from a single sheet of high heat conductivity metal, such as aluminum, copper or alloys thereof to name the most common. These heat conducting elements include flat platen plates 90, 92 having a width W, as shown in FIG. 2, to accommodate the width of a laminate C which is to pass between the platens and toward driven rolls 20, 22. For easy entry, plates 90, 92 are provided with outwardly flared ends 94, 96, respectively. Heating elements 80, 82 also include heat receptor portions 100, 102, respectively, each of which includes a heat receptor surface 110, 112. These surfaces match the donor surfaces 50, 52, respectively, so that the receptor surfaces can lie in close heat conduction relationship with the outer donor surfaces of heating elements 40, 42. To hang attachment B onto the heating elements, there is provided a tab 120 extending along receptor portion 100. This downwardly bent tab extends over the top of and engages the back side of heating element 40 for securing or hanging attachment B in the heat conducting relationship shown in FIG. 1. A tab 122 is bent downwardly from heat receptor portion 102 to allow a pivoting motion for releasably securing attachment B over heating elements 40, 42. Heat conducting elements 80, 82 include bent intermediate portions 124, 126 which allow receptor portions 100, 102 to extend around a greater portion of heating elements 40, 42 and still terminate in generally flat platen plates 90, 92. This bend also allows the flat platen plates to extend substantially between heating elements 40, 42 without interrupting their generally flat, parallel relationship.

Platen plates 90, 92 are resiliently joined to be biased with respect to each other in a vertical direction on opposite sides of feed line or pass P. A resilient joining of plates 90, 92 forms attachment B into a unit and can be provided by a variety of structures as long as the structure does not interfere with the opening available along pass P. In accordance with the illustrated embodiment, four bolts 130 extend through plates 90, 92 and receive appropriate nuts 132. These bolts are spaced from each other in a transverse direction with respect to pass P to provide a transverse distance L, as shown in FIG. 2. This spacing between the bolts defines the maximum width of a laminate which can be accepted by the attachment B. Springs 134, 136 resilient bias platen plates 90, 92 with respect to each other in a vertical direction perpendicular to pass P so that both plates can shift somewhat in a perpendicular direction to accommodate different sized laminates C and still exert pressure on the laminates.

To accumulate a storage of heat energy, platen plates 90, 92 are provided with coextensive heat holding plates 140, 142, also formed from a high heat conductivity metal, such as aluminum, copper and alloys thereof. These holding plates have a thickness substantially greater than the thickness of the metal sheet used in forming heat conducting elements 80, 82. In practice, the thickness of these plates is substantially greater than twice the thickness of the heat conducting elements. These plates are attached to the outer surfaces of platen plates 90, 92 by any appropriate arrangement and store heat conducted to plates 90, 92 from the heat receptor surfaces 110, 112 of receptor portions 100, 102, respectively.

Figure 2A:
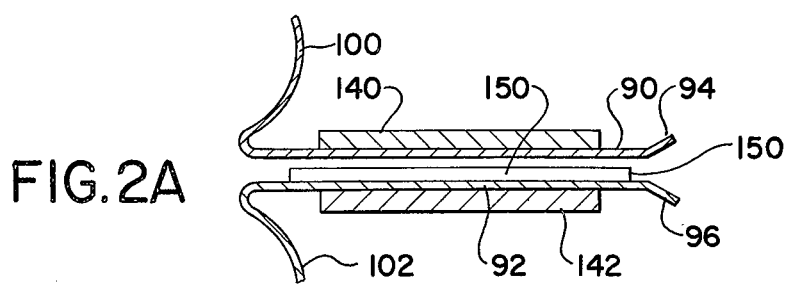
FIG. 2A is a partial view illustrating an operating characteristic of the preferred embodiment of the present invention.

In practice, relatively thin spacers 150 are positioned between flat platen plates 90, 92 to hold these plates apart a distance less than the normal thickness of a laminate C to be processed by attachment B. Two strip spacers 150 are used in the illustrated embodiment and extend along the plates 90, 92 outside of bolts 130. These spacers can be provided on either of the platen plates; however, as illustrated in FIG. 2A, the spacer strips 150 are secured onto the upper surface of lower platen plate 92. This completes the general construction of attachment B. The attachment will hang over elements 40, 42 and be supported with surfaces 110, 112 engaging surfaces 50, 52, respectively. To form a further support and provide a protection for the heated portions of attachment B, there is provided a bracket 152 extending over the top of heat holding plate 140 and secured thereto by springs 134. In practice, there may be a slight spacing between bracket 152 and plate 140 to allow upward movement of platen plate 90 against spring 136. Lower plate 92 can move vertically against the spring action of springs 134. Bracket 152 includes transversely spaced bent supports 154 onto which a cover 156 is secured. This cover has a front plate 158 which extends downwardly and engages the relatively short rail 70. This provides further support for attachment B as it is in the position shown in FIGS. 1, 4 and 5. An appropriate handle 159 can be used to apply and remove attachment B from the somewhat standard machine A.

When attachment B is removed from the machine A for normal use of the machine, shield 76 is placed into the position shown in FIG. 3. In a like manner, a transversely extending platform 160 is slipped between side rails 70, 72 which are positioned on the opposite side walls of frame 10. This platform includes a front stop 162 which limits the forward position of platform 160, as shown in FIG. 3. When the platform is assembled, sheet workpieces to be laminated by the material on reels 12, 14 can be fed between heating elements 40, 42. Lamination takes place in machine A in accordance with the normal use of this type of machine.

Figure 4:
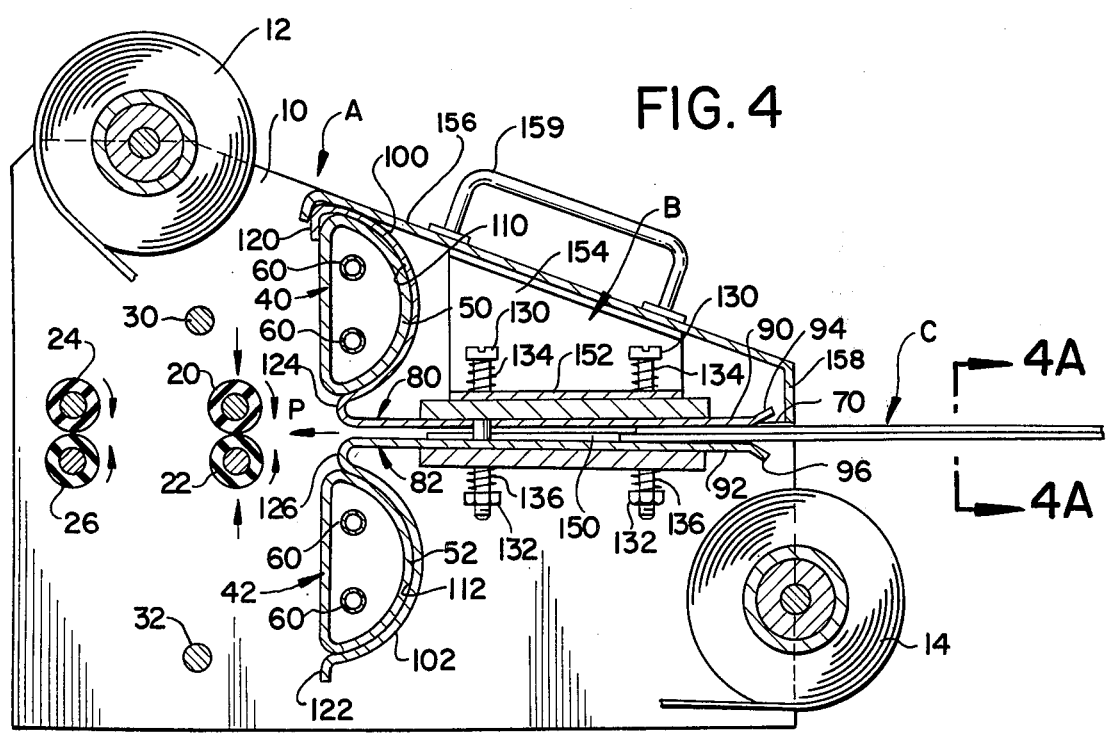
FIG. 4 is a view similar to FIG. 3 illustrating the preferred embodiment of the present invention in position and operating upon a dry mounting laminate.
Figure 5:
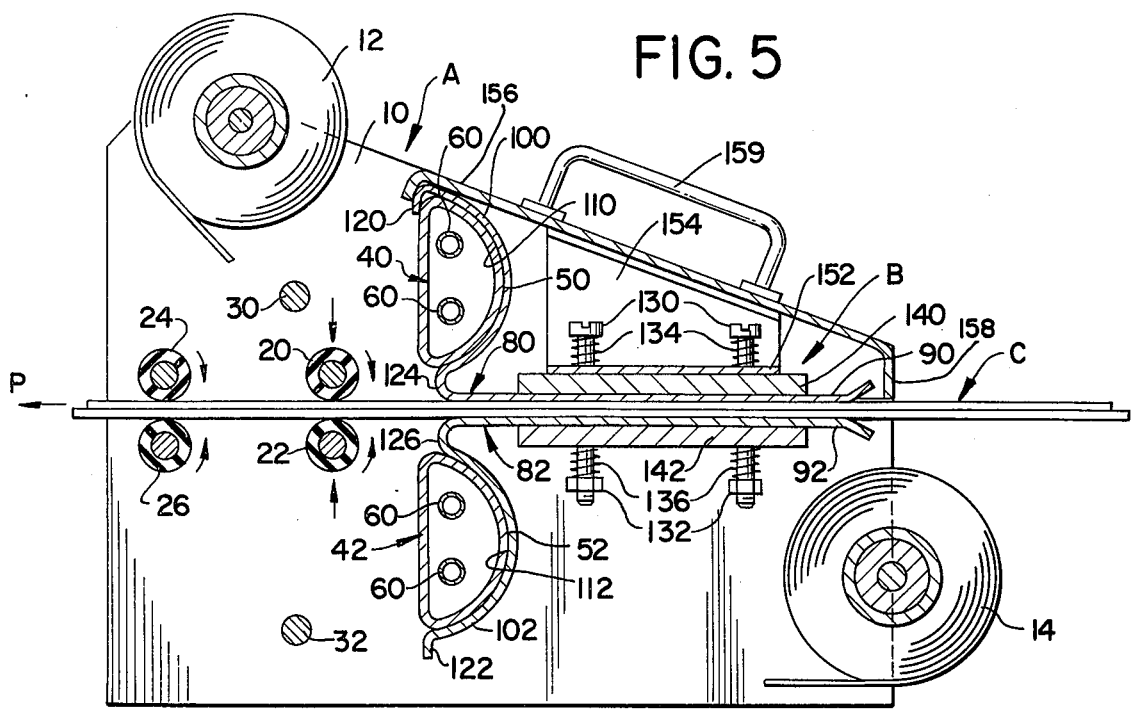
FIG. 5 is a side elevational view similar to FIG. 4 showing the laminate as it progresses through the preferred embodiment of the present invention; and, FIG. 6 is an enlarged partial view in cross-section illustrating schematically an operating characteristic of the preferred embodiment.

In the prior operation mode, the machine A is operated in accordance with the showing of FIG. 3. To convert this machine for producing a dry mounting structure, platform 160 is withdrawn from rails 70, 72. Shield 76 is removed from rails 74. Thereafter, attachment B is positioned over heating elements 40, 42, as shown in FIGS. 1, 4 and 5. The attachment itself is supported by heat receptor portions 100, 102. Cover 156 also supports attachment B by the front plate 158 and bracket 152. Heat energy from heating elements 40, 42 is conducted from donor surfaces 50, 52 to the heat receptor surfaces 110, 112 of receptor portions 100, 102, respectively. This heat energy is then conducted around bent intermediate portions 124, 126 to the platen plates 90, 92. This causes an accumulation of heat energy in plates 90, 92, and also in the heat holding plates 140, 142 so that a relatively stable heated condition is retained at the inner, spaced parallel surfaces of platen plates 90, 92. The length of laminate C is sufficiently great to allow engagement with driven rolls 20, 22 by hand feeding laminate C between spring biased plates 90, 92. The plates separate slightly to accommodate the laminate and provide a tight heat conducting engagement with the laminate. This heats both sides of the laminate to a sufficient temperature for securing the print to the rigid board stock at least during the subsequent pressure engagement of rolls 20, 22. Slight movement of plates 90, 92 is allowed by flexing of heat conducting elements 80, 82 and slight movement thereof with respect to heating elements 40, 42. When the laminate C first enters between plates 90, 92, any moisture within the laminate is vaporized and forms a gas which is squeezed and forced toward the front of the machine A as shown in FIG. 6. This squeezing action is continued at rolls 20, 22. The initial insertion of laminate C is shown in FIG. 4. As the laminate continues through the machine A, it assumes the position shown in FIG. 5. In this position, rolls 20, 22 and rolls 24, 26 draw the laminate through the machine. The first set of rolls generally finalizes the lamination of the laminate. Spacers 150 have widths less than the thickness of laminate C so that pressure is exerted on the laminate as it passes through machine A.

Figure 4A:
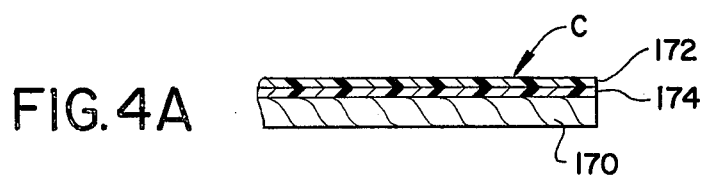
FIGS. 4A and 4B are enlarged cross-sectional views schematically illustrating the laminate or flat composite, sheet structure to be procesed by the preferred embodiment of the present invention.
Figure 4B:
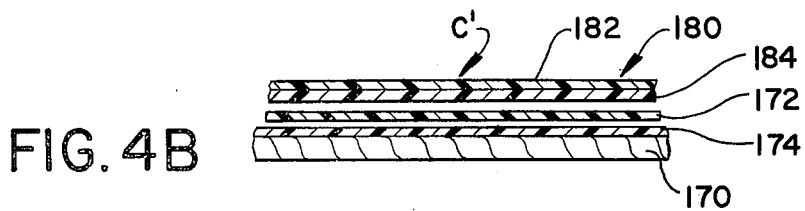

In practice, laminate C includes a rigid board stock 170, as shown in FIG. 4A. On one side of the board stock there is provided a graphic print 172. Between the print and board stock is a hot adhesive layer 174 which is capable of heat and pressure sealing with both the print and the board stock. Thus, as laminate C passes through plates 90, 92 good heat conducting relationship is established between the print, the board and the plates. This heats the print and board to a sufficiently high temperature to heat seal adhesive layer 174, which in practice may be polyethylene. Final sealing and laminating is accomplished by the driven rolls 20, 22. In some instances, it may be advisable to protect the outer surface of print 170. This is illustrated in FIG. 4B wherein laminate C' includes an upper covering layer 180 which may be formed from an appropriate material, such as Mylar 182 with a lower surface of heat sealing material, such as polyethylene 184. Laminate C' is fed into attachment B as previously described. In this manner, protective covering 180 forms a protection over print 170 in the final laminating structure. The gas squeezing function may be accomplished at the pressure rolls 20, 22 which squeezes the final moisture to the rear of laminate C or laminate C' as it passes between the final laminating rolls.

To convert machine A back to its normal operating mode, as shown in FIG. 3, attachment B is manually removed by handle 159. Shield 76 and platform 160 are then attached to machine A for normal operation. Although reels 12, 14 are shown in FIGS. 1, 4 and 5 they are not used during the operation of attachment B.

Having thus described the invention, the following is claimed:

1. An attachment for use on a sheet laminating machine including two vertically spaced upper and lower heating elements defining therebetween a sheet workpiece pass for movement of sheet material between said heating elements from front to back thereof, each of said heating elements having a front facing, curvilinear heated donor surface extending transversely of said workpiece pass and spaced from said pass, and two vertically spaced pressure rolls extending tranversely of said pass with one of said rolls on each vertical side of said pass, said rolls being spaced from the back of said heating elements for pressing together heated material traveling along said workpiece pass, said attachment comprising: first and second heat conducting elements formed from a metal having high thermal conductivity, each of said heat conducting elements having a generally flat platen plate and an integral heat receptor portion, means for securing said platen plates together in general parallel relationship, said heat receptor portion of one of said heat conducting elements having a receptor surface generally matching the donor surface of said upper heating element, the heat receptor portion of the other of said heat conducting elements having a receptor surface generally matching the donor surface of said lower heating element, and means for releasably mounting said attachment onto said heating elements with said receptor surface of said one heat conducting element engaging said donor surface of said upper heating element, said receptor surface of said other heat conducting element engaging said donor surface of said lower heating element and said platen plates being on opposite sides of said pass and said mounting means includes a hanger member formed integrally with said one heat conducting element and a means for releasably receiving said hanger member.

2. An attachment for use on a sheet laminating machine including two vertically spaced upper and lower heating elements defining therebetween a sheet workpiece pass for movement of sheet material between said heating elements from front to back thereof, each of said heating elements having a front facing, curvilinear heated donor surface extending transversely of said workpiece pass and spaced from said pass, and two vertically spaced pressure rolls extending transversely of said pass with one of said rolls on each vertical side of said pass, said rolls being spaced from the back of said heating elements for pressing together heated material traveling along said workpiece pass, said attachment comprising: first and second heat conducting elements formed from a metal having high thermal conductivity, each of said heat conducting elements having a generally flat platen plate and an integral heat receptor portion, means for securing said platen plates together in general parallel relationship, said heat receptor portion of said first heat conducting element having a receptor surface generally matching the donor surface of said upper heating element, the heat receptor portion of said second heat conducting element having a receptor surface generally matching the donor surface of said lower heating element, and means for releasably mounting said attachment onto said heating elements with said receptor surface of said first heat conducting element engaging said donor surface of said upper heating element, said receptor surface of said second heat conducting element engaging said donor surface of said lower heating element and said platen plates being on opposite sides of said pass, and said mounting means includes a hanger member secured onto said first heat conducting element and a means for releasably receiving said hanger member.

* * * * *